United States Patent
Corriveau et al.

[19]

[11] Patent Number: 5,918,177
[45] Date of Patent: Jun. 29, 1999

[54] SYSTEM AND METHOD OF PROVIDING A MOBILE STATION'S SERVICE SUPPORT INFORMATION TO A RADIO TELECOMMUNICATIONS NETWORK

[75] Inventors: Michel Corriveau, St-Hubert; Pat Minichiello, Montreal, both of Canada

[73] Assignee: Telefonaktiebolaget LM Ericsson (publ), Stockholm, Sweden

[21] Appl. No.: 08/810,700

[22] Filed: Mar. 3, 1997

Related U.S. Application Data

[60] Provisional application No. 60/031,857, Nov. 27, 1996.

[51] Int. Cl.⁶ ............................................. H04Q 7/20
[52] U.S. Cl. ........................... 455/432; 455/414; 455/458
[58] Field of Search ................................. 455/422, 445, 455/458, 432, 403, 414, 434, 433; 370/54, 329; 379/57, 58

[56] References Cited

U.S. PATENT DOCUMENTS

| | | | |
|---|---|---|---|
| 5,175,758 | 12/1992 | Levanto et al. | 379/57 |
| 5,381,464 | 1/1995 | O'Keefe et al. | 379/59 |
| 5,396,539 | 3/1995 | Slekys et al. | 379/59 |
| 5,428,665 | 6/1995 | Lantto | 379/58 |
| 5,457,680 | 10/1995 | Kamm et al. | 370/17 |
| 5,473,671 | 12/1995 | Partridge, III | 379/59 |
| 5,553,129 | 9/1996 | Partridge, III | 379/220 |
| 5,563,939 | 10/1996 | La Porta et al. | 379/220 |
| 5,577,029 | 11/1996 | Lu et al. | 370/54 |
| 5,724,664 | 3/1998 | Lantto | 455/560 |
| 5,734,699 | 3/1998 | Lu et al. | 379/58 |
| 5,761,195 | 6/1998 | Lu et al. | 370/329 |
| 5,781,858 | 7/1998 | Lantto | 455/414 |
| 5,797,103 | 8/1998 | Duda | 455/567 |
| 5,832,382 | 11/1998 | Alpervich | 455/433 |

FOREIGN PATENT DOCUMENTS

| | | |
|---|---|---|
| WO 94/05104 | 3/1994 | WIPO . |
| WO 95/35002 | 12/1995 | WIPO . |
| WO 96/31072 | 10/1996 | WIPO . |

*Primary Examiner*—Edward F. Urban
*Assistant Examiner*—Pablo Tran
*Attorney, Agent, or Firm*—Smith & Danamraj, P.C.

[57] ABSTRACT

A system and method of ensuring that a called mobile station's expected service type matches a calling party's service type in a radio telecommunications network in which both voice service and data service are provided. A service code generator in a serving mobile switching center (MSC) generates a service code that indicates the calling party's service type. The service code is sent in a page from the serving MSC to the mobile station, and includes the service code. An expected service code generator in the called mobile station generates an expected service code that indicates the called mobile station's expected service type. The expected service code is sent in a page response from the mobile station to a border MSC that borders the serving MSC. The border MSC extracts the expected service code and sends it to the serving MSC where it is compared with the calling party's service code. If the service codes match, the call is connected to the mobile station. If the service codes do not match, the mobile station is denied access to the radio telecommunications network.

9 Claims, 6 Drawing Sheets

FIG. 3

| UnsolicitedResponse | INVOKE Parameters | | | Timer: URT |
|---|---|---|---|---|
| Field | Value | Type | Reference | Notes |
| Identifier | SET[UNIVERSAL 17] | M | 6.4.1.2 | |
| Length | variable octets | M | 6.4.1.1 | |
| Contents | | | | |
| ElectronicSerialNumber | | M | 6.5.2.63 | |
| MobileIdentificationNumber | | M | 6.5.2.81 | |
| BillingID (Anchor) | | M | 6.5.2.16 | |
| Digits (Destination) | | O | 6.5.2.58 | a |
| ExtendedMSCID (Border MSC) | | O | 6.5.2.64 | a |
| ExtendedSystemMyTypeCode (Border MSC) | | O | 6.5.2.65 | a |
| PC_SSN (Border MSC) | | O | 6.5.2.93 | a,b |
| SystemAccessType | | O | 6.5.2.145 | c |
| TDMAServiceCode | | O | 6.5.2.XXX | d |

FIG. 4

| UnsolicitedResponse | RETURN RESULT | Parameters | | |
|---|---|---|---|---|
| Field | Value | Type | Reference | Notes |
| Identifier | SET[UNIVERSAL 17] | M | 6.4.1.2 | |
| Length | variable octets | M | 6.4.1.1 | |
| Contents | | | | |
| AccessDeniedReason | | O | 6.5.2.1 | h |
| AlertCode | | O | 6.5.2.3 | a |
| BillingID (Originating) | | O | 6.5.2.16 | b |
| CallingPartyNumberString1 | | O | 6.5.2.23 | c |
| CallingPartyNumberString2 | | O | 6.5.2.24 | c |
| CallingPartySubaddress | | O | 6.5.2.25 | c |
| DMH_AccountCodeDigits | | O | 6.5.2.59 | d |
| DMH_AlternateBillingDigits | | O | 6.5.2.60 | d |
| DMH_BillingDigits | | O | 6.5.2.61 | d |
| ExtendedMSCID (Originating MSC) | | O | 6.5.2.64 | e |
| ExtendedSystemMyTypeCode (Originating MSC) | | O | 6.5.2.65 | f |
| Leginformation | | O | 6.5.2.75 | g |
| MobileDirectoryNumber | | O | 6.5.2.80 | d |
| MSCIdentificationNumber (Origination MSC) | | O | 6.5.2.83 | g |
| OneTimeFeatureIndicator | | O | 6.5.2.88 | g |
| PC_SSN (Originating MSC) | | O | 6.5.2.93 | h |
| PilotBillingID | | O | 6.5.2.94 | g |
| PilotNumber | | O | 6.5.2.95 | g |
| RedirectingNumberString | | O | 6.5.2.108 | c |
| RedirectingSubaddress | | O | 6.5.2.109 | c |
| TerminationTreatment | | O | 6.5.2.158 | g |
| TerminationTriggers | | O | 6.5.2.159 | g |

FIG. 5A

| Field | Value | Type | Reference | Notes |
|---|---|---|---|---|
| Identifier | AccessDeniedReason IMPLICIT Unsigned Enumerated | M | 6.5.1.2 | |
| Length | 1 octet | M | 6.5.1.1 | |
| Contents | | | | |

| H | G | F | E | D | C | B | A | octet | Notes |
|---|---|---|---|---|---|---|---|---|---|
| \multicolumn{8}{Access Denied Reason} | 1 | |

FIG. 5B

AccessDeniedReason (octet 1)

| Bits H G F E D C B A | Value | Meaning |
|---|---|---|
| 0 0 0 0 0 0 0 0 | 0 | Not Used. |
| 0 0 0 0 0 0 0 1 | 1 | Unassigned directory number (the MS is not served by the accessed system). |
| 0 0 0 0 0 0 1 0 | 2 | Inactive (the MS is not active in the accessed system and the HLR pointer to the to the MS's VLR should be maintained). |
| 0 0 0 0 0 0 1 1 | 3 | Busy (the MS is busy in the accessed system and cannot accept additional calls). |
| 0 0 0 0 0 1 0 0 | 4 | Termination Denied (terminations to this MS are not allowed). |
| 0 0 0 0 0 1 0 1 | 5 | No Page Response (the MS was paged by the accessed system but did not respond). |
| 0 0 0 0 0 1 1 0 | 6 | Unavailable (the MS is currently not available and the HLR pointer to the MS's VLR should be maintained and the MS shall remain in the same state). |
| 0 0 0 0 0 1 1 1 | 7 | <u>Service Type Mismatch. (the MS responded to a page in the border system with a service type that differs from the one used by the system that paged).</u> |
| 0 0 0 0 1 0 0 0 ... 1 1 0 1 1 1 1 1 | 8 through 223 | Reserved. Treat the same as value 4, Termination Denied. |
| 1 1 1 0 0 0 0 0 ... 1 1 1 1 1 1 1 1 | 224 through 255 | Reserved for IS-41 protocol extension. If unknown, treat the same as value 4, Termination Denied. |

SYSTEM AND METHOD OF PROVIDING A MOBILE STATION'S SERVICE SUPPORT INFORMATION TO A RADIO TELECOMMUNICATIONS NETWORK

This application claims benefit of Provisional Appln. 60/031,857, filed Nov. 27, 1996.

TECHNICAL FIELD OF THE INVENTION

This invention relates to radio telecommunication systems and, more particularly, to a system and method of providing a mobile station's service support information in a radio telecommunications network.

DESCRIPTION OF RELATED ART

In existing radio telecommunications networks, there is a network of mobile switching centers (MSCs) with contiguous coverage. Each MSC, therefore has one or more bordering MSCs. The MSCs provide switching and call control for mobile-originated and mobile-terminating calls. When a terminating call is made to a mobile station operating within the service area of a serving MSC, the serving MSC pages the mobile station to determine its availability to receive the call. If the mobile station is available, it sends a page response to the serving MSC indicating its availability. The mobile station may not respond if the subscriber has turned off the mobile station, moved out of the service area, or is currently busy. If the subscriber subscribes to features such as call forwarding or voice mail services, the call may be forwarded to another number or to a voice mail machine.

When voice (speech) services were the only services offered by the radio telecommunications network, it was adequate for the mobile station page response to merely indicate the mobile station's availability. However, with the advent of asynchronous data services (ADS) and facsimile services (G3 Fax), additional information regarding the type of service needs to be passed in the serving MSC's page and the mobile station's page response. This is because some mobile stations may have only speech capability and cannot receive ADS or G3 Fax terminating calls. Other mobile stations may be incapable of supporting these newer services for other reasons. The service type that the mobile station is expecting in a call needs to be transmitted to the MSC that paged it for correlation with the service for which it was paged.

This is not a serious problem when the mobile station is responding to the MSC that paged it. However, if the mobile station rescans for a frequency shift keying control channel (FSK CC) and locks onto a control channel in a border MSC, it then responds to the page in the border MSC. The border MSC currently has no way to notify the MSC originating the page whether a mobile station responding to the page is capable of supporting the particular service for which it was paged. Therefore, it is possible for an incompatible call (for example, an ADS or a G3 Fax call) to be through-connected to a mobile station with only speech capability.

The known prior art neither teaches nor suggests a solution to the aforementioned deficiency and shortcoming such as that disclosed herein.

In order to overcome the disadvantage of existing solutions, it would be advantageous to have a method of passing to the MSC paging the mobile station, the capabilities of the mobile station to receive such services as ADS and G3 Fax. The present invention provides such a method.

SUMMARY OF THE INVENTION

In one aspect, the present invention is a method of ensuring that a called mobile station's expected service type matches a calling party's service type in a radio telecommunications network in which both voice service and data service are provided. The method begins by sending a page from a serving mobile switching center (MSC) to the mobile station, the page including a service code indicating the calling party's service type. The paged mobile station rescans for a control channel and locks onto a control channel in a border MSC that borders the serving MSC. A page response is then sent from the mobile station to the border MSC, the page response including an expected service code indicating the called mobile station's expected service type. This is followed by sending the expected service code from the border MSC to the serving MSC, and determining in the serving MSC whether the service code matches the expected service code. Upon determining that the service code matches the expected service code, the call is then connected to the mobile station. However, upon determining that the service code does not match the expected service code, the mobile station is denied access to the telecommunications network.

In another aspect, the present invention is a system for ensuring that a called mobile station's expected service type matches a calling party's service type in a radio telecommunications network in which both voice service and data service are provided. The system includes a service code generator in a serving mobile switching center (MSC) for generating a service code that indicates the calling party's service type, and a first paging mechanism in the serving MSC for sending a page from the serving MSC to the mobile station, the page including the service code indicating the calling party's service type. The system also includes an expected service code generator in the called mobile station for generating an expected service code that indicates the called mobile stations expected service type, and a second paging mechanism in the called mobile station for sending a page response from the mobile station to a border MSC that borders the serving MSC, the page response including an expected service code indicating the called mobile station's expected service type. The system further includes means for sending the expected service code from the border MSC to the serving MSC, and a service code comparison mechanism in the serving MSC for determining whether the service code matches the expected service code. Within the network there is also means for connecting the call to the mobile station upon determining that the service code matches the expected service code, and means for denying the mobile station access to the telecommunications network upon determining that the service code does not match the expected service code.

BRIEF DESCRIPTION OF THE DRAWINGS

The invention will be better understood and its numerous objects and advantages will become more apparent to those skilled in the art by reference to the following drawing, in conjunction with the accompanying specification, in which:

FIG. 3 is a table of parameters of an ANSI-41 Unsolicited Response Invoke message which has been modified in accordance with the teachings of the present invention;

FIG. 4 is a table of parameters of an ANSI-41 Unsolicited Response Return Result message which has been modified in accordance with the teachings of the present invention;

FIGS. 5A–5B are a table of the contents of an ANSI-41 Access Denied Reason parameter which has been modified in accordance with the teachings of the present invention.

DETAILED DESCRIPTION OF EMBODIMENT

Figure 1:
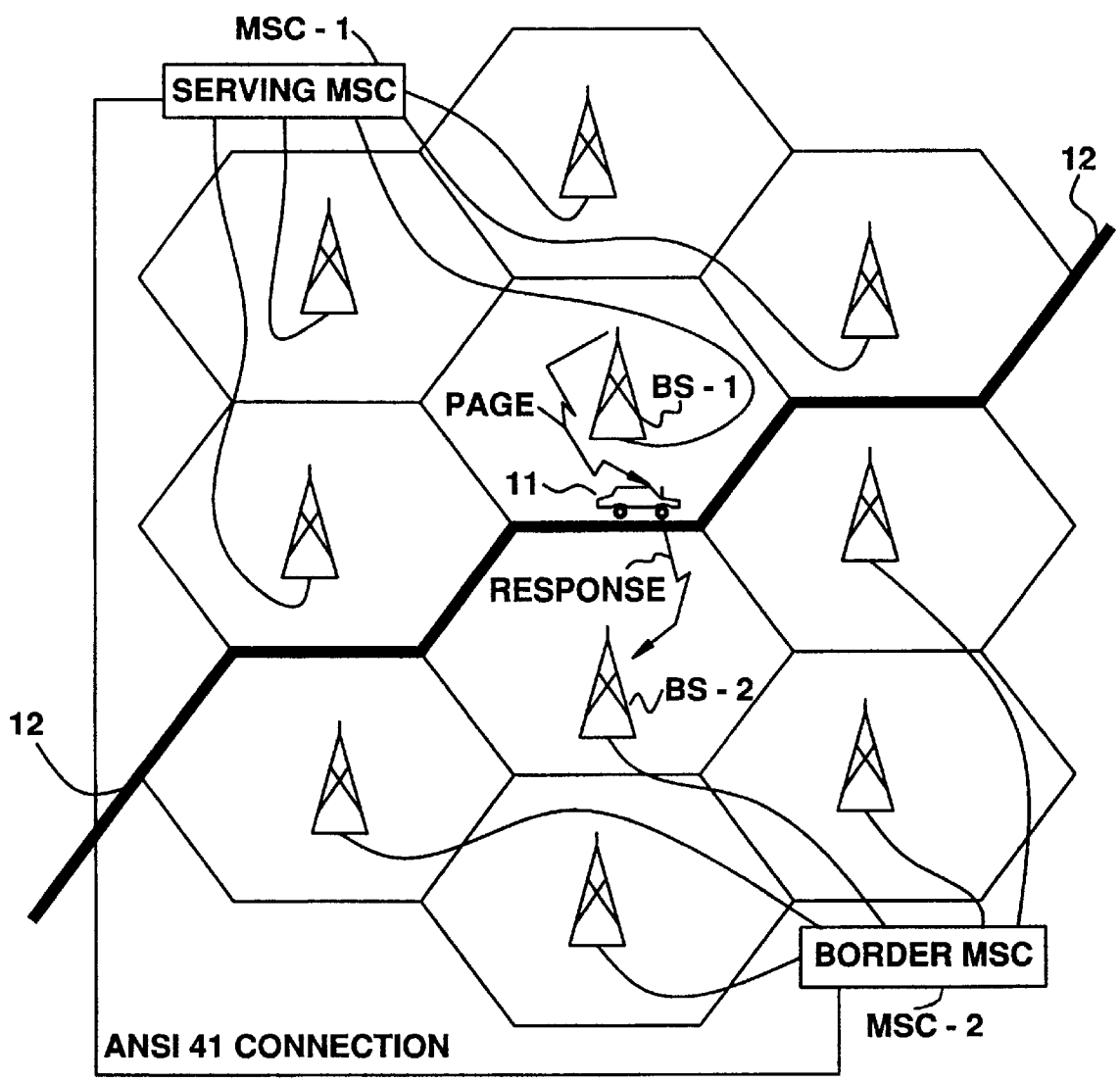
FIG. 1 (Prior Art) is an illustrative drawing of a portion of an existing radio telecommunications network showing the border between a serving MSC (MSC-1) and a border MSC (MSC-2)

FIG. 1 is an illustrative drawing of a portion of an existing radio telecommunications network showing a border 12 between a serving MSC (MSC-1) and a border MSC (MSC-2). Each MSC is connected to a plurality of base stations (BS) which transmit radio signals to and from mobile stations (MS) operating within each base station's cell of coverage. In the network of FIG. 1, MSC-1 is connected to BS-1, and MSC-2 is connected to BS-2. A mobile station 11 is operating near the border 12 between MSC-1 and MSC-2.

In the example depicted in FIG. 1, MSC-1 originates a page to the mobile station 11 which is believed to be in the service area of MSC-1. The page is made on a frequency shift keying control channel (FSK CC). If the mobile station 11 is available, it receives the page and rescans and locks onto a FSK CC. The mobile station then responds to the page that it received, and if the mobile station has locked onto a control channel in MSC-2, the page response is sent to MSC-2. Since MSC-2 did not page the mobile station, this response is considered by MSC-2 to be an unsolicited page response.

MSC-2 then notifies each of its bordering MSCs, including MSC-1, that MSC-2 has received an unsolicited page response. This notification is made with an ANSI-41 message known as an unsolicited page response message. MSC-1 then has the call routed to MSC-2 for delivery to the mobile station. The ANSI-41 standard is hereby incorporated by reference herein.

With the introduction of ADS and G3 Fax services in existing networks, pages from MSCs are modified to include service codes which identify the service type for the call. Still referring to FIG. 1, when the mobile station responds in the border MSC, the page response is modified to include a service code for the type of call that the mobile station expects to receive. If the call is a data call, and the mobile station does not understand the new service codes, it may respond with a default code for speech. MSC-2 may recognize that the mobile station has responded with a service code for speech, but MSC-2 does not know this. If the call is connected, the mobile station will be expecting speech while data is being sent.

Figure 2:
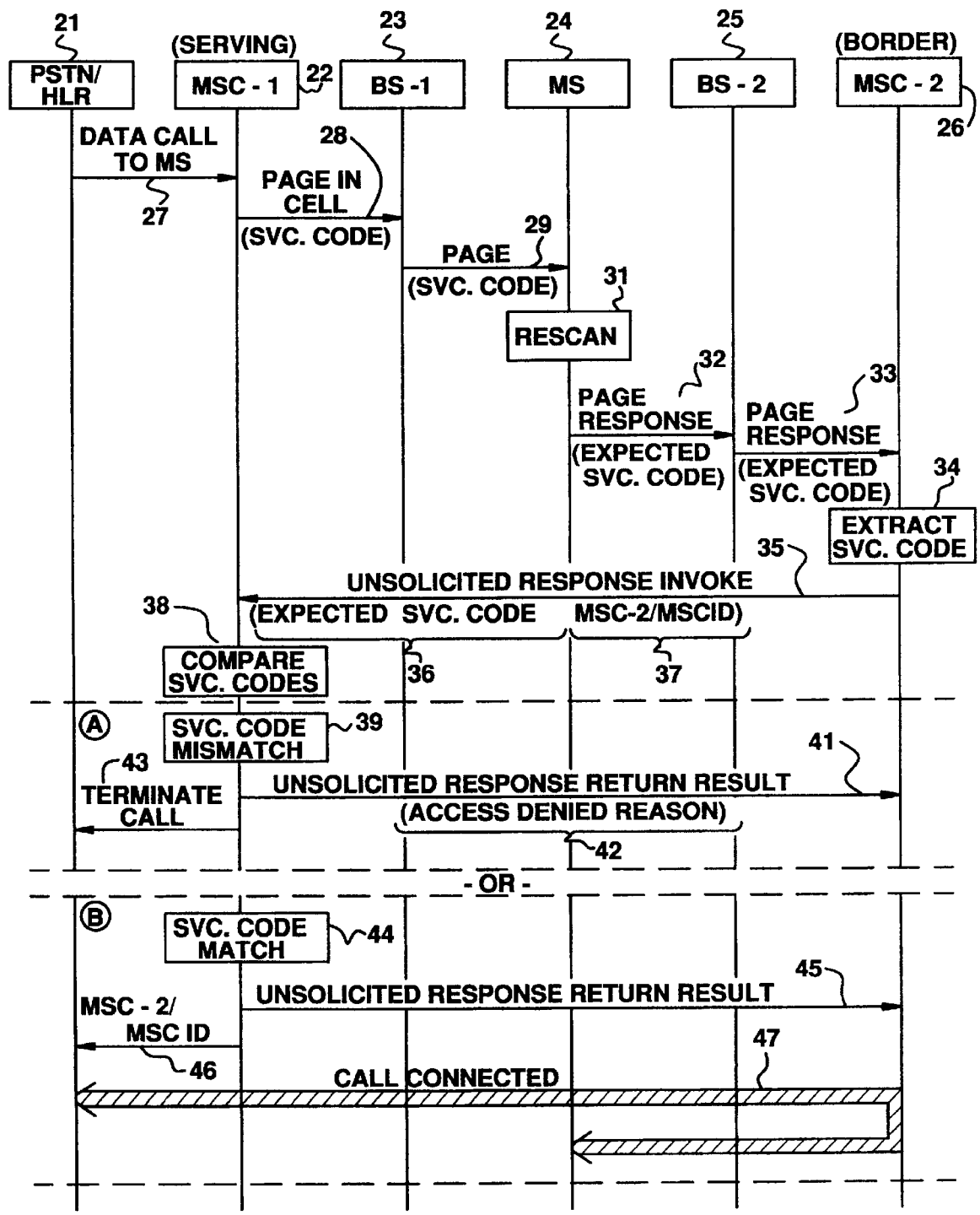
FIG. 2 is a message flow diagram illustrating the messages utilized in the preferred embodiment of the present invention.

FIG. 2 is a message flow diagram illustrating the messages utilized in the preferred embodiment of the present invention. A call for a mobile station may originate from, for example the Public Switched Telephone Network (PSTN) or from another mobile station in the Public Land Mobile Network (PLMN). If the call is from the PSTN, it is directed through a gateway mobile switching center (G-MSC) (not shown) to the subscriber's home location register (HLR) before being routed to the serving MSC-1. Likewise, a call from another mobile station in another MSC is also routed through the subscribers HLR to the serving MSC-1.

FIG. 2 illustrates a PSTN/HLR 21, a serving MSC (MSC-2) 22, a base station (BS-1) 23 within MSC-2, a called mobile station (MS) 24, a base station (BS-2) 25 within MSC-2, and a border MSC (MSC-2) 26. A data call 27 is directed to the MS 24. MSC-1 then sends a paging order 28 to BS-1 to page for the MS 24 in its cover-age ell. MSC-1 includes a service code in the paging order which indicates that the call is a data call. BS-1 then transmits a page 29 to MS 24 and includes the service code.

MS 24 then rescans at 31 for a FSK CC and locks onto a control channel in MSC-2. The MS identifies the service code in the page 29 and transmits a page response 32 to BS-2 and includes an expected service code. BS-2 sends the page response to MSC-2 at 33, and includes the MS's expected service code. MSC-2 identifies the page response as an unknown page response. At 34, MSC-2 extracts the MS's expected service code.

MSC-2 then sends an ANSI-41 unsolicited response invoke message 35 to not its border MSCs that it has received an unknown page response from a mobile station. In the method of the present invention, MSC-2 provides in the unsolicited response invoke message an expected service code parameter 36 indicating the expected service code that the mobile station provided in its page response, along with MSC-2's identification number (MSCID) 37. At 38, MSC-1 then compares the expected service code parameter 36 received in the unsolicited response invoke message 35 with the service code that MSC-1 sent in the page order 28. MSC-1 then validates whether the MS 24 has responded with the proper service code for the type of call being delivered.

For service type matching in MSC-1, the present invention compares service types rather than specific service codes. This is done because there are, for example, several service codes corresponding to speech. For example, there are service codes identifying analog speech or digital speech, and analog or digital speech (analog preferred or digital preferred). There are also service codes for several types of data such as asynchronous data and G3 Fax. If a mobile station is paged for speech, and responds with one of the service codes pertaining to speech, then there is a match. If an expected service code of an entirely different type is received, then there is a mismatch.

If MSC-1 determines there is a service type mismatch at 39, the process enters alternative A. MSC-1 then sends an unsolicited response return result message 41 to MSC-2 denying access to MS 24. An optional Access Denied Reason parameter 42 is included in the unsolicited response return result message 41. An instruction 43 to terminate the call is then routed to the originating switch for the call.

However, if the service code comparison at 38 results in a service typematch at 44, the process enters alternative B. MSC-1 grants access to MS 24 by sending an unsolicited response return result message 45 to MSC-2 without the optional Access Denied Reason parameter 42. At 46, MSC-1 then sends the MSCID for MSC-2 to the originating switch for the call. At 47, the call is then through-connected from the originating switch via MSC-2 to the MS 24.

FIG. 3 is a table of parameters of an Unsolicited Response Invoke message which has been modified in accordance with the teachings of the present invention. A new parameter (TDMA Service Code) 36 is added by the present invention to indicate the service type with which MS 24 responded to the page in MSC-2.

FIG. 4 is a table of parameters of an Unsolicited Response Return Result message which has been modified in accordance with the teachings of the present invention. A new parameter (Access Denied Reason) 42 is added by the present invention to indicate that the MS 24 responded to a page in MSC-2 with a service type that differs from the one used by the system that paged (MSC-1).

FIGS. 5A–5B are a table of the contents of an Access Denied Reason parameter which has been modified in accordance with the teachings of the present invention. FIG. 5A illustrates that the Access Denied Reason parameter comprises a single octet. FIG. 5B illustrates the meanings for various bits in the octet. A new value (7) is added to the octet to indicate a service type mismatch whenever a MS responds to a page in a border system with a service type that differs from the one used by the system that paged.

Figure 6:
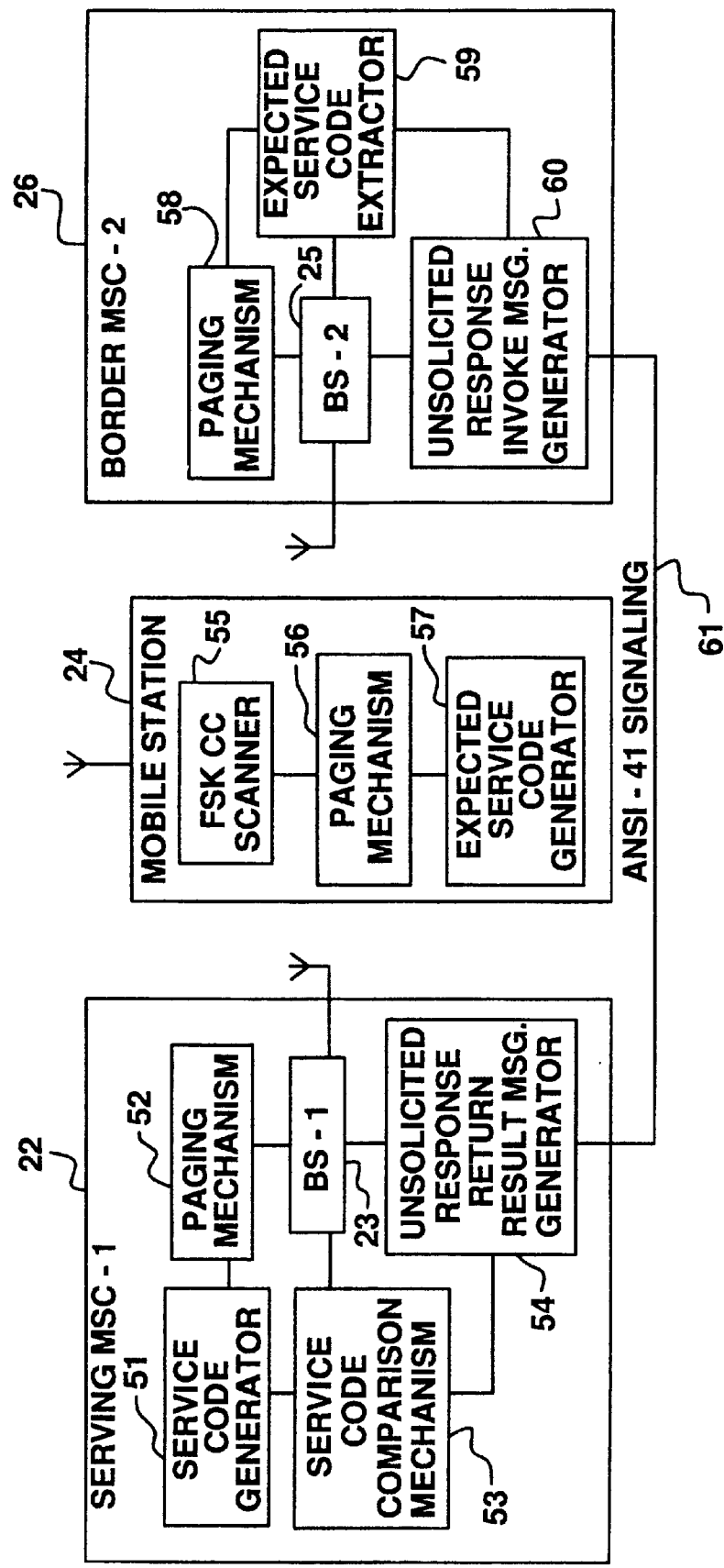
FIG. 6 is a simplified block diagram of the preferred embodiment of the system of the present invention.

FIG. 6 is a simplified block diagram of the preferred embodiment of the system of the present invention. With reference to FIGS. 2 and 6, the system includes the serving MSC (MSC-1) 22, the mobile station (MS) 24, and the border MSC (MSC-2) 26 which borders the serving MSC-1. The serving MSC-1 includes a service code generator 51, a paging mechanism 52, a service code comparison mechanism 53, an unsolicited response return result message generator 54, and the base station (BS-1) 23. Within the MS 24 are a control channel (FSK CC) scanner 55, a paging mechanism 56, and an expected service code generator 57. The border MSC-2 includes a paging mechanism 58, an expected service code extractor 59, an unsolicited response invoke message generator 60, and the base station 25.

Within the serving MSC-1, the service code generator 51 generates a service code that indicates the calling party's service type. This service code is passed to the paging mechanism 52 that sends a page via BS-1 23 from the serving MSC-1 to the MS 24. The page includes the service code indicating the calling party's service type.

Upon receipt of the page in the called MS 24, the MS utilizes its FSK CC scanner to rescan for a control channel. In the example described here, the MS 24 locks onto a control channel broadcast by BS-2 25 in the border MSC-2. The MS 24 then utilizes the expected service code generator 57 to generate an expected service code that indicates the called mobile station's expected service type. The expected service code is included in a page response sent by the paging mechanism 56 in the called MS to the border MSC-2. The page response with expected service type is received by BS-2 25. The border MSC-2 utilizes the expected service code extractor 59 to extract the MS's expected service code from the page response. The unsolicited response invoke message generator 60 is then used to send the expected service code from the border MSC-2 to the serving MSC-1. This information is sent via ANSI-41 signaling 61.

Within the serving MSC-1, the service code indicating the calling party's service type, and the expected service code indicating the called mobile station's expected service type are compared in the service code comparison mechanism 53. If the service code matches the expected service code,, the call is connected to the MS 24. If the service code does not match the expected service code, the MS 24 is denied access to the radio telecommunications network.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defied in the following claims.

What is claimed is:

1. In a radio telecommunications network in which both voice service and data service are provided, a method of ensuring that a called mobile station's expected service type matches a calling party's service type, said method comprising the steps of:

sending a page from a serving mobile switching center (MSC) to said mobile station, said page including a service code indicating the calling party's service type;

sending a page response from said mobile station to a border MSC that borders said serving MSC, said page response including an expected service code indicating the called mobile station's expected service type;

sending said expected service code from said border MSC to said serving MSC;

determining in said serving MSC whether said service code matches said expected service code;

connecting said call to said mobile station upon determining that said service code matches said expected service code; and denying said mobile station access to said telecommunications network upon determining that said service code does not match said expected service code.

2. In a radio telecommunications network in which both voice service and data service are provided, a method of ensuring that a called mobile station's expected service type matches a calling party's service type, said method comprising the steps of:

sending a page from a serving mobile switching center (MSC) to said mobile station, said page including a service code indicating the calling party's service type;

sending a page response from said mobile station to a border MSC that borders said serving MSC, said page response including an expected service code indicating the called mobile station's expected service type;

sending said expected service code from said border MSC to said serving MSC in an unsolicited response invoke message;

determining in said serving MSC whether said service code matches said expected service code;

connecting said call to said mobile station upon determining that said service code matches said expected service code; and denying said mobile station access to said telecommunications network upon determining that said service code does not match said expected service code.

3. The method of ensuring that a called mobile station's expected service type matches a calling party's service type of claim 2 wherein it is determined that said service code does not match said expected service code, said method further comprising sending a reason for denying access from said serving MSC to said border MSC.

4. The method of ensuring that a called mobile station's expected service type matches a calling party's service type of claim 3 wherein said step of sending a reason for denying access from said serving MSC to said border MSC includes sending an access denied reason parameter in an unsolicited response return result message.

5. The method of ensuring that a called mobile station's expected service type matches a calling party's service type of claim 3 wherein said step of determining in said serving MSC whether said service code matches said expected service code includes determining whether said service code and said expected service code are of the same service type.

6. In a radio telecommunications network in which both voice service and data service are provided, a system for ensuring that a called mobile station's expected service type matches a calling party's service type, said system comprising:

a service code generator in a serving mobile switching center (MSC) for generating a service code that indicates the calling party's service type;

a first paging mechanism in the serving MSC for sending a page from the serving MSC to said mobile station, said page including the service code indicating the calling party's service type;

an expected service code generator in the called mobile station for generating an expected service code that indicates the called mobile station's expected service type;

a second paging mechanism in said called mobile station for sending a page response from said mobile station to a border MSC that borders said serving MSC, said page response including an expected service code indicating the called mobile stations expected service type;

means for sending said expected service code from said border MSC to said serving MSC;

a service code comparison mechanism in said serving MSC for determining whether said service code matches said expected service code;

means for connecting said call to said mobile station upon determining that said service code matches said expected service code; and means for denying said mobile station access to said telecommunications network upon determining that said service code does not match said expected service code.

7. In a radio telecommunications network in which both voice service and data service are provided, a system for ensuring that a called mobile station's expected service type matches a calling party's service type, said system comprising:

a service code generator in a serving mobile switching center (MSC) for generating a service code that indicates the calling party's service type;

a first paging mechanism in the serving MSC for sending a page from the serving MSC to said mobile station, said page including the service code indicating the calling party's service type:

an expected service code generator in the called mobile station for generating an expected service code that indicates the called mobile station's expected service type;

a second paging mechanism in said called mobile station for sending a page response from said mobile station to a border MSC that borders said serving MSC, said page response including an expected service code indicating the called mobile station's expected service type;

means for sending said expected service code from said border MSC to said serving MSC, said sending means including means for sending said expected service code in an unsolicited response invoke message;

a service code comparison mechanism in said serving MSC for determining whether said service code matches said expected service code;

means for connecting said call to said mobile station upon determining that said service code matches said expected service code; and means for denying said mobile station access to said telecommunications network upon determining that said service code does not match said expected service code.

8. The system for ensuring that a called mobile station's expected service type matches a calling party's service type of claim 7 wherein it is determined that said service code does not match said expected service code, said system further comprising means for sending a reason for denying access from said serving MSC to said border MSC.

9. The system for ensuring that a called mobile station's expected service type matches a calling party's service type of claim 8 wherein said means for sending a reason for denying access from said serving MSC to said border MSC includes an access denied reason parameter in an unsolicited response return result message.

* * * * *